United States

Baker

[11] 3,807,836
[45] Apr. 30, 1974

[54] COMPACT FOUR ELEMENT OBJECTIVE LENSES OF PLASTIC AND GLASS

[75] Inventor: James G. Baker, Winchester, Mass.

[73] Assignee: Polaroid Corporation, Cambridge, Mass.

[22] Filed: Jan. 2, 1973

[21] Appl. No.: 320,612

[52] U.S. Cl. .......................... 350/221, 350/175 NG
[51] Int. Cl. .................... G02b 9/44, G02b 9/56
[58] Field of Search .................................. 350/221

[56] References Cited
UNITED STATES PATENTS
3,619,036  11/1971  Baker .............................. 350/221

Primary Examiner—John K. Corbin

[57] ABSTRACT

Compact air-spaced four element photographic objective lenses are shown. Each has an overall length less than one-tenth its focal length. Chromatic and spherical aberrations, coma, astigmatism, field curvature, and distortion are corrected for the lenses. They are focused by moving their first element to change the air space between the first and second elements. Their corrections are optimum when they focus a subject approximately nine focal lengths distant. An important feature of these objective lenses is the use of both plastic and glass lens elements in the same objective lens.

8 Claims, 2 Drawing Figures

| SPECIE A | | | | |
|---|---|---|---|---|
| F=1.000 | | L.O.A. = 0.092 | | f/8.0 |
| LENS | $n_d$ | V | RADII | THICKNESSES |
| I | 1.678 | 55.2 | $R_1$ = 0.233<br>$R_2$ = PLANO | $t_1$ = 0.0204<br>$s_1$ = 0.0044 |
| II | 1.492 | 57.2 | $R_3$ = -0.479<br>$R_4$ = 0.326 | $t_2$ = 0.0063<br>$s_2$ = 0.0125 |
| III | 1.592 | 30.8 | $R_5$ = -0.466<br>$R_6$ = 0.392 | $t_3$ = 0.0063<br>$s_3$ = 0.0214 |
| IV | 1.643 | 48.0 | $R_7$ = 1.109<br>$R_8$ = -0.253 | $t_4$ = 0.0261<br>$s_4$ = 0.9980 |

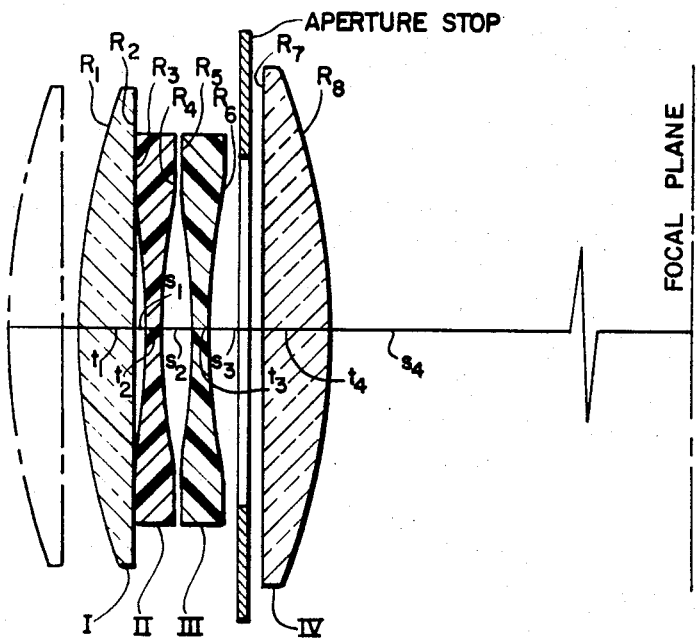
| SPECIE A | | | | |
|---|---|---|---|---|
| F=1.000 | | L.O.A.=0.092 | | f/8.0 |
| LENS | $n_d$ | $\nu$ | RADII | THICKNESSES |
| I | 1.678 | 55.2 | $R_1=$ 0.233<br>$R_2=$ PLANO | $t_1=$ 0.0204<br>$s_1=$ 0.0044 |
| II | 1.492 | 57.2 | $R_3=-0.479$<br>$R_4=$ 0.326 | $t_2=$ 0.0063<br>$s_2=$ 0.0125 |
| III | 1.592 | 30.8 | $R_5=-0.466$<br>$R_6=$ 0.392 | $t_3=$ 0.0063<br>$s_3=$ 0.0214 |
| IV | 1.643 | 48.0 | $R_7=$ 1.109<br>$R_8=-0.253$ | $t_4=$ 0.0261<br>$s_4=$ 0.9980 |

COMPACT FOUR ELEMENT OBJECTIVE LENSES OF PLASTIC AND GLASS

BACKGROUND OF THE INVENTION

This application describes several novel species of objective lenses described and claimed in my U.S. Pat. No. 3,619,036, issued Nov. 9, 1971.

Four element lens systems comprising outer positive elements with inner negative elements have long been known. These systems of early vintage usually consisted of outer positive elements which had the same or substantially the same indices of refraction and Abbe $\nu$ values and of inner negative elements which also had the same or substantially the same indices of refraction and Abbe $\nu$ values. Generally, the positive elements had higher indices of refraction and higher Abbe $\nu$ values than the inner negative elements. This simple construction led to an approximately symmetrical objective for an infinitely long conjugate and for 1:1 conjugates to an exactly symmetrical objective. The lens systems of this general design as known in the prior art are not especially compact; in some instances, their overall length is more than one-third their focal length. The correction for field curvature as represented by the Petzval sum, P, is not optimum either in the majority of prior art lenses of this general four element configuration.

The design of useful photographic objectives requires consideration of the correction of many different aberrations inherent in optical lens systems. Some of the aberrations which must be dealt with, and which the optical designer must seek to correct, include lateral and longitudinal chromatic aberrations, coma, astigmatism, field curvature, and distortion. Correction of the chromatic aberrations is particularly important in modern photographic objectives because of the wide-spread use of color photographic films. In treating these aberrations and in attempting to find solutions within the other desired parameters of a photographic objective, for example, size and cost of the final design, the designer must deal with the results of many simultaneous solutions of many non-linear equations that are closely related mathematically, even if they must be treated in segments. The effect of several of these aberrations on the design of a compact, well-corrected photographic objective is set forth in my U.S. Pat. No. 3,619,036.

Cost is an important consideration in creating a lens design intended for a serial production of several million units. It enters into the selection of the materials for the lens elements, both for their absolute cost and for the cost of making accurate lens elements from those materials. The cost of materials and the cost of fabricating them into finished lens elements was of primary importance in creating the objective lens species set out below.

The chromatic aberrations of an optical system are of two distinct types, i.e., longitudinal and lateral.

Longitudinal chromatic aberration results from the lens having a different image location along the axis for each wavelength of light because the index of refraction is different for each wavelength of light. Lateral chromatic aberration is the designation given to the formation of color images of different size because of differences in magnification caused by focal length dependence on wavelength. This defect can remain even in a lens which is corrected for longitudinal chromatism.

The corrections for longitudinal and lateral chromatic aberrations are achieved in two different manners. A classical correction for longitudinal chromatic aberration is the use of closely spaced, typically contacting, pairs of optical elements. These pairs, generally known as achromatic doublets, are constructed from two different glasses or plastics. A glass or plastic having a large Abbe $\nu$ value is used for the stronger or convergent element in the doublet. The weaker or divergent element of the achromatic doublet is typically made from a glass or plastic having a lower Abbe $\nu$ value. In older art the stronger or convergent element typically had the lower refractive index of the two optical materials, but in more recent practice a wider choice of refractive indices prevails, according to other requirements. The shapes of the respective elements can be determined through the use of formulas known to those skilled in the art. The result is a pair of lenses which in combination tend to cancel each other's chromatic dispersion, but which have a net optical power other than zero. This result is achieved because of the relatively large differences in chromatic dispersion between the types of optical materials employed. The achromatic double so described, composed of a closely spaced, contacting pair of elements, is also substantially corrected for lateral color without further design control. This comes about because, for very thin lens elements in contact, the principal planes for the several wavelengths will all lie fairly close to each other. The focal lengths for these wavelengths will then be approximately the same. The sizes of the respective images for different wavelengths of light will then be approximately equal in the common image plane produced by the prior correction for longitudinal chromatic aberration, and the lateral chromatic aberration is thereby minimized.

The approximate correction described above for lateral chromatic aberration inherent in a thin achromatic doublet does not hold in the case of thick lens elements nor for lens elements which are not nearly in contact with each other. Such a thick, or air-spaced, doublet will then suffer from lateral chromatic aberration even though corrected for longitudinal chromatic aberration. This is so because for thick lenses and for lenses physically separated from each other the principal planes for the several wavelengths of light do not lie close together. Thus, while several wavelengths may have a common image plane whereby longitudinal chromatic aberration is corrected, the focal lengths for the several wavelengths will be different, resulting in a different size of image for the different wavelengths even though the images lie in a common plane. Therefore, an air-spaced doublet cannot be corrected simultaneously for longitudinal and lateral chromatic aberrations unless it is further compounded.

If longitudinal chromatic aberration is not corected, then lateral chromatic aberration can be eliminated in a fairly simple manner by the use of two lens elements. They can even be made from the same optical material. This correction for lateral chromatic aberration is achieved by separating the two elements with an air space equal to one-half the sum of the focal lengths of the two elements. This correction for lateral chromatic aberration yields the same magnification for every wavelength of light, but the various images will lie in different image planes. It can be seen then that this correction for lateral chromatic aberration introduces strong longitudinal chromatic aberration. The solution, therefore, is unsatisfactory by itself for use in photographic objectives which are required to bring the images of various wavelengths into a common plane in which a photosensitive material can be placed. In the above solution for lateral chromatic aberration, it will be appreciated that to form an optical system of reasonable size the two elements that are to be spaced apart should be of opposite but not equal power.

It has been a common practice to reduce or to eliminate lateral chromatic aberration by combining elements into similar but opposed groupings on either side of a central stop. In this way, the prismatic dispersions of the chief rays can be made more or less equal in magnitude but opposite in algebraic sign for the two groupings. The optical system as a whole will then show little or no final dispersion of the chief rays at the image plane, even though in either grouping separately a very large chromatic dispersion of the chief ray exists. Then also in the prior art it has been the practice to correct each group separately for longitudinal chromatic aberration, which then remains corrected for the system when the two groupings are combined. The combination of two elements for each grouping on either side of a central stop or plane of symmetry in the prior art then permitted the designer to employ thick lens elements or large air spaces, or both, to achieve simultaneous corrections for longitudinal and lateral chromatic aberrations and other monochromatic aberrations. Because of this, the overall length of this general class of photographic objectives has been considered to be an inconsequential result of the design for correcting the chromatic aberrations. This assumption has placed an artificial limitation on the compactness which can be achieved in a photographic camera.

It has been a common practice to achieve a flattening of the image field by making use of comparatively large air spaces between the positive and negative lens elements where the freedom to correct the chromatic aberrations by choice of glasses and approximate symmetry has been retained. It is known that the nature of the Petzval sum, P, which is the curvature or reciprocal radius of an anastigmatic image surface, requires that the collective negative lens powers of the system be only somewhat smaller in numerical magnitude than the collective positive powers of the system. The net power of the system, however, depends on this similar sum of the individual powers as modified by the air spaces. It has been assumed that if the net power of the system is to be acceptably large, the air spaces must be large. In the prior art, compromises have been made resulting in both an overall length between front and rear elements amounting to a large fraction of the focal length of the system and in some residual curvature of field arising from too large a value for the Petzval sum, P, in different measures.

This invention, by contrast, considers the overall barrel length as a variable which can be controlled to achieve an intentionally compact, well-corrected photographic objective lens.

BRIEF SUMMARY OF THE INVENTION

Among the principal objects of this invention are to provide:

a compact photographic objective lens whose overall length is less than one-tenth of its focal length;

a compact photographic objective lens that is well corrected for spherical aberration, coma, astigmatism, and distortion as well as longitudinal and lateral chromatic aberrations having an approximately flat field, represented by a Petzval sum less than 0.225;

a compact photographic objective lens that is focused by changing the first air space and that remains sufficiently well corrected for all aberrations throughout a range of object distances from three times its focal length to infinity; and a compact photographic objective lens adapted for inexpensive serial production.

These and other objects of the invention are accomplished by a compact four element lens system of two divergent plastic lenses surrounded by two convergent glass lenses which exhibits a particular relationship between the Abbe $\nu$ values of the outer lenses and the Abbe $\nu$ values of the inner elements. The special relationship to be observed in accordance with this invention is that the minimum Abbe $\nu$ value of the two outer elements does not exceed 1.2 times the maximum Abbe $\nu$ value of the two inner elements. This relationship can be expressed as a ratio, hereinafter referred to as Baker's Ratio, thus:

$$(\nu_{1,\ 4\ min})/(\nu_{2,\ 3\ max}) > 1.2$$

In the several species tabulated below, the value of Baker's Ratio is equal to or less than 0.90. Those species represent compact inexpensive objective lenses each with overall length not exceeding one-tenth its focal length and an approximately flat field with a Petzval sum less than 0.200.

The present formula sets forth the radii and spacings necessary to provide an optimum correction for aberrations across an image field having a diagonal equal to one focal length when the objective lens focuses on a subject about nine focal lengths away.

DESCRIPTION OF THE DRAWINGS

Additional objects and advantages of the invention are more fully set forth in the accompanying detailed description taken together with the accompanying drawings wherein:

FIG. 1 is a cross-sectional view of a compact, well-corrected photographic objective according to the invention in which focusing is accomplished by adjustment of the front element;

FIG. 2 gives the constructional data, based on unit focal length, for the objective lens of FIG. 1.

DETAILED DESCRIPTION

FIG. 1 shows a very compact four element photographic objective lens. Lens elements I through IV are numbered in order from the long conjugate or front side of the objective lens to the short conjugate or rear of the lens. Lens element I is shown in the position for which the compact photographic objective is focused at infinity. The dotted lines represent the position of lens element I when the objective lens is focused on an object approximately three times its focal length away. As seen in the figure, element I and element IV are both convergent glass lenses while elements II and III are biconcave divergent plastic lenses. Air space $S_1$ is short when the objective lens system is focused at infinity. Air space $S_1$ increases in size as the front element I is adjusted to focus the photographic objective lens system on a nearby object. Air space $S_2$ forms a negative air lens between plastic lens elements II and III. The size of air space $S_2$ remains constant. The space $S_3$ between lenses III and IV is the largest of the air spaces. The size of air space $S_3$ also remains constant. The relatively large size of $S_3$ permits the location of an aperture stop between elements III and IV. It is also possible, in this comparatively large air space, to utilize a between-the-lens shutter at this location.

Element I is a plano-convex lens. The first surface $R_1$ has a relatively strong curvature. The second surface $R_2$ is plano (flat). The radii $R_3$ on the plastic element II and $R_5$ on the plastic element III are noticeably curved but are not the strongest curves in the lens system. The surfaces $R_4$ and $R_6$ have intermediate curvatures, the former being stronger than the latter. They are stronger than $R_3$ and $R_5$ but weaker than $R_1$ and $R_8$. The surface represented by $R_7$ has only a slight curve. The curvature of surface $R_8$ on element IV is almost as strong as the curvature of $R_1$.

The formulas below give constructional data for four species of an objective lens according to generic teachings set forth in my U.S. Pat. No. 3,619,036. These species have their optimum correction for aberrations at a subject distance of about nine focal lengths and a useful field with a diameter equal to one focal length.

It should be understood that for any particular application of the invention, a preferred region of the spectrum may be used in the design. For consistency herein, index $n$, Abbe value $\nu$, and Petzval sum P have been chosen or calculated for the helium d-line. L.O.A. designates the overall length of the objective lens, when it is set to focus at infinity, between surfaces $R_1$ and $R_8$. The air space $S_1$ increases to focus the objective lens on subjects at finite distances; the value tabulated for it is for infinity focus.

Specie A

| Lens | $n_d$ | $\nu$ | Radii | Thicknesses |
|---|---|---|---|---|
| I | 1.678 | 55.2 | $R_1 = 0.233$ | $t_1 = 0.0204$ |
|   |       |      | $R_2 =$ plano | $S_1 = 0.0044$ |
| II | 1.492 | 57.2 | $R_3 = -0.479$ | $t_2 = 0.0063$ |
|    |       |      | $R_4 = 0.326$ | $S_2 = 0.0125$ |
| III | 1.592 | 30.8 | $R_5 = -0.466$ | $t_3 = 0.0063$ |
|     |       |      | $R_6 = 0.392$ | $S_3 = 0.0214$ |
| IV | 1.643 | 48.0 | $R_7 = 1.109$ | $t_4 = 0.0261$ |
|    |       |      | $R_8 = -0.253$ | $S_4 = 0.998$ |

F = 1.00  
L.O.A. = 0.092  
f/8.0  
Baker's Ratio = 0.84  
Petzval sum = 0.190

Specie B

| Lens | $n_d$ | $\nu$ | Radii | Thicknesses |
|---|---|---|---|---|
| I | 1.697 | 56.2 | $R_1 = 0.219$ | $t_1 = 0.0206$ |
|   |       |      | $R_2 =$ plano | $S_1 = 0.0059$ |
| II | 1.492 | 57.2 | $R_3 = -0.483$ | $t_2 = 0.0078$ |
|    |       |      | $R_4 = 0.27$ | $S_2 = 0.0113$ |
| III | 1.592 | 30.8 | $R_5 = -0.567$ | $t_3 = 0.0078$ |
|     |       |      | $R_6 = 0.357$ | $S_3 = 0.0204$ |
| IV | 1.589 | 48.7 | $R_7 = 0.845$ | $t_4 = 0.0196$ |
|    |       |      | $R_8 = -0.251$ | $S_4 = 0.984$ |

F = 1.00  
L.O.A. = 0.093  
f/8.0  
Baker's Ratio = 0.85  
Petzval sum = 0.187

Specie C

| Lens | $n_d$ | $\nu$ | Radii | Thicknesses |
|---|---|---|---|---|
| I | 1.678 | 55.2 | $R_1 = 0.214$ | $t_1 = 0.0207$ |
|   |       |      | $R_2 =$ plano | $S_1 = 0.0059$ |
| II | 1.492 | 57.2 | $R_3 = -0.486$ | $t_2 = 0.0078$ |
|    |       |      | $R_4 = 0.272$ | $S_2 = 0.0114$ |
| III | 1.592 | 30.8 | $R_5 = -0.540$ | $T_3 = 0.0078$ |
|     |       |      | $R_6 = 0.334$ | $S_3 = 0.0205$ |
| IV | 1.589 | 48.7 | $R_7 = 0.731$ | $t_4 = 0.0197$ |
|    |       |      | $R_8 = -0.248$ | $S_4 = 0.9875$ |

F = 1.00  
L.O.A. = 0.094  
f/8.0  
Baker's Ratio = 0.85  
Petzval sum = 0.198

Specie D

| Lens | $n_d$ | $\nu$ | Radii | Thicknesses |
|---|---|---|---|---|
| I | 1.678 | 55.2 | $R_1 = 0.213$ | $t_1 = 0.0207$ |
|   |       |      | $R_2 =$ plano | $S_1 = 0.0056$ |
| II | 1.492 | 57.2 | $R_3 = -0.500$ | $t_2 = 0.0072$ |
|    |       |      | $R_4 = 0.277$ | $S_2 = 0.0093$ |
| III | 1.592 | 30.8 | $R_5 = -0.701$ | $t_3 = 0.0072$ |
|     |       |      | $R_6 = 0.352$ | $S_3 = 0.0113$ |
| IV | 1.615 | 51.2 | $R_7 = 1.179$ | $t_4 = 0.0311$ |
|    |       |      | $R_8 = -0.270$ | $S_4 = 0.986$ |

F = 1.00  
L.O.A. = 0.092  
f/8.0  
Baker's Ratio = 0.90  
Petzval sum = 0.189

An important consideration in designing a photographic objective for use with a flat film pack is minimizing the curvature of the objective's image field. The magnitude of the field curvature is commonly measured by a term known as the Petzval sum, P. The Petzval sum depends solely on the indices of refraction and surface curvatures of the objective's individual elements. The curvature of field represented by the Petzval sum should not ordinarily, in a practical lens, be made zero; a compromise between Petzval field flatness and higher order aberrations must be accepted, otherwise the complete correction of one will be at an unacceptable cost to the correction of the other. The species disclosed herein combining plastic and glass optical materials have Petzval sums less than 0.200.

In the invention embodied in the species of objective lenses disclosed herein, the selection of optical materials for the components with regard to Baker's Ratio makes it possible to achieve a field flatness, as measured by the Petzval sum, superior to that of any other photographic objective known to the art having a comparably short barrel length, except those described in my issued U.S. Pat. No. 3,619,036.

In calculations for short barrel objective lens systems, it has been discovered that the correction for several aberrations benefits by having the Abbe $\nu$ values of the second element rather large compared to that of the third element which is the case in all the examples. The third surface of these compact objectives is one of strong refraction, governing a good part of the chromatic spherical aberration and off-axis aberrations of the lower rim rays. It has, therefore, a strong tendency to cause too large an inward refraction of the lower rim rays for the shorter wavelengths. That tendency can be reduced if the Abbe $\nu$ value of the second element is raised to provide less color dispersion. The requirement for an on-axis longitudinal chromatic correction thereafter in the lens system causes the dispersion number of the third element to be lower than it otherwise would be, but still of moderate value because of the desired short lens barrel.

The circumstances of color correction are such that the designer is working in a proper direction by using a lower Abbe $\nu$ value for either of the outlying convergent elements and an increased Abbe $\nu$ value for either of the inner divergent elements, compared to the simple case where the divergent elements have substantially the same $\nu$ value as each other and the convergent elements have substantially the same $\nu$ value. Several considerations, outlined below, lead to the desirability of having the greatest value of Abbe $\nu$ value in the second element.

In the species set out above, the tabulated first air space $S_1$ is for the lens focused at infinity.

The third air space, $S_3$, is limited by performance requirements and the need for locating therein a shutter or iris diaphragm or both. Another consideration is the importance of maintaining some symmetry of construction for a mean focal setting in order that the correction for distortion, coma, and lateral color be reasonably well met.

The first radius, $R_1$, is positive, that is, a convex surface. If the radius is too long, the front element will either be too biconvex or too weak in optical power. If the element I is too weak, front element focusing requires excessive movement that increases the variations of lateral chromatism, distortion, and astigmatism with focusing. If $R_1$ is too short, and the element I is too strong, serious oblique aberrations will be introduced, and these will be exacerbated by the front element focusing. If $R_1$ is too short and the lens power appropriate, the front element will be more of a strong positive meniscus lens. Such a lens is not acceptable for front element focusing over an extended range.

Where front element focusing is employed, the second surface, $R_2$, should be flat (plano). A plano surface $R_2$ minimizes variation in the astigmatic coefficient over the extended focusing range of the front element I.

If $R_3$ is too concave, excessive inward and uncorrectible coma is caused. If not sufficiently concave, the element will have insufficient optical power, throwing too much burden on the third element with consequent damage to the oblique ray performance.

It is important for the optical performance of the objective that the central air space be a negative air lens. Coma correction requires that the adjacent surfaces $R_4$ and $R_5$ both be concave. If $R_4$ is too shallow, that is, concave but of large radius, the second element must be optically weak, upsetting other corrections again, or else it is bent toward the long conjugate too much, resulting in too concave a third surface $R_3$.

The fifth surface $R_5$, if too concave, may cause excessive inward coma and over-corrected spherical aberration. If too long in radius, that is, too weakly concave, the optical power of the third element will wither be too low resulting in inability to correct the system for longitudinal and lateral chromatism, or else $R_6$ will be too concave leading to excessive outward coma and possible over-corected spherical aberration.

The sixth radius $R_6$ of the system is concave inasmuch as a substantial portion of the Petzval correction for flatness of field occurs here. Too short a radius, numerically, will cause over-corrected spherical aberration and oblique spherical aberration as well as an excessive outward coma. Too long a radius causes unacceptable curvature of field and under-correction generally for longitudinal chromatic aberration.

In objective lenses according to this invention, $R_7$ is weakly convex. If this seventh surface were to be stronger, an excessively under-corrected astigmatism results.

The last surface of the system, the eighth radius, is strongly convex, but if too convex, strongly under-corrected spherical aberration results. Its strength aids in attaining adequate flatness of field.

As a general rule, in compact optical systems of this type, the convergent outer elements should have high indices and the divergent inner elements should have lower indices.

A teaching of this invention is that the refractive index of the first convergent element should be greater than 1.60 for compact systems at $f/8$ intended to have focusing front elements.

The refractive index of the second element should generally be low and in accord with the available plastics, polymethyl methacrylate is used.

The refractive index for the divergent element III should be higher than element II, but lower than elements I and IV. In systems of the type considered here, much of the color correction is effected by element III. The nature of commercial optically useful plastics is such that polystyrene is chosen for its relatively strong dispersion.

The refractive index of the last or fourth convergent element IV according to this invention should be high, almost equal to that for the first element, as shown in the examples. The range is, therefore, greater than for the first element and becomes from $n = 1.50$ to $n = 1.90$.

The ranges of Abbe $\nu$ value have also been determined for this invention. Clearly, if all glasses had infinite $\nu$, there would be no need for color correction and there would be no need for even calculating at other than a mean wavelength. In general, a high Abbe $\nu$ value in the front element reduces the effect on the residual color aberrations of that element's movement for focusing.

The use of plastic for lens elements II and III allows large-scale production of the finished lens elements by well-known molding techniques, thereby omitting separate centering and edging operations. It becomes simple to mold aspheric surfaces on those lenses if so desired. Glass outer elements I and IV of the objective provide protection for the less hard plastic lens surfaces from abrasion and other abuse.

In light of the foregoing discussion, it should be understood that the species discussed above in explicit detail are to be taken as illustrative of the broad principles of this invention and not necessarily as limiting on its scope.

What is claimed is:

1. A compact, four element photographic objective lens having the design parameters for a unit focal length, F, Presented in the following table:

Specie A

| Lens | $n_d$ | $\nu$ | Radii | Thicknesses |
|---|---|---|---|---|
| I | 1.678 | 55.2 | $R_1 = 0.233$ | $t_1 = 0.0204$ |
|  |  |  | $R_2 =$ plano | $S_1 = 0.0044$ |
| II | 1.492 | 57.2 | $R_3 = -0.479$ | $t_2 = 0.0063$ |
|  |  |  | $R_4 = 0.326$ | $S_2 = 0.0125$ |
| III | 1.592 | 30.8 | $R_5 = -0.466$ | $t_3 = 0.0063$ |
|  |  |  | $R_6 = 0.392$ | $S_3 = 0.0214$ |
| IV | 1.643 | 48.0 | $R_7 = 1.109$ | $t_4 = 0.0261$ |
|  |  |  | $R_8 = -0.253$ | $S_4 = 0.998$ |

F = 1.00
L.O.A. = 0.092
f/8.0
Baker's Ratio = 0.84
Petzval sum = 0.190 wherein Roman numerals identify lens elements in order from front to rear; $n_d$ is the refractive index at 587.6 nanometers; $\nu$ is the Abbe's ratio; $R_1, R_2, \ldots$ represent radii of successive refractive surfaces from front to rear; $t$ and $S$ represent thickness of lens elements and air spaces, respectively.

2. The compact, four element photographic objective lens described in claim 1, wherein focusing on close subjects is accomplished by moving the first element, Lens I, to increase $S_1$.

3. A compact, four element photographic objective lens having the design parameters for a unit focal length, F, presented in the following table:

Specie B

| Lens | $n_d$ | $\nu$ | Radii | Thicknesses |
|---|---|---|---|---|
| I | 1.697 | 56.2 | $R_1 = 0.219$ | $t_1 = 0.0206$ |
|   |       |      | $R_2 = $ plano | $S_1 = 0.0059$ |
| II | 1.492 | 57.2 | $R_3 = -0.483$ | $t_2 = 0.0078$ |
|   |       |      | $R_4 = 0.27$ | $S_2 = 0.0113$ |
| III | 1.592 | 30.8 | $R_5 = -0.567$ | $t_3 = 0.0078$ |
|   |       |      | $R_6 = 0.357$ | $S_3 = 0.0204$ |
| IV | 1.589 | 48.7 | $R_7 = 0.845$ | $t_4 = 0.0196$ |
|   |       |      | $R_8 = -0.251$ | $S_4 = 0.984$ |

F = 1.00
L.O.A. = 0.093
f/8.0
Baker's Ratio = 0.85
Petzval sum = 0.187 wherein Roman numerals identify lens elements in order from front to rear; $n_d$ is the refractive index at 587.6 nanometers; $\nu$ is the Abbe's ratio; $R_1, R_2, \ldots$ represent radii of successive refractive surfaces from front to rear; $t$ and $S$ represent thicknesses of lens elements and air spaces, respectively.

4. The compact, four element photographic objective lens described in claim 3, wherein focusing on close subjects is accomplished by moving the first element, Lens I, to increase $S_1$.

5. A compact, four element photographic objective lens having the design parameters for a unit focal length, F, presented in the following table:

Specie C

| Lens | $n_d$ | $\nu$ | Radii | Thicknesses |
|---|---|---|---|---|
| I | 1.678 | 55.2 | $R_1 = 0.214$ | $t_1 = 0.0207$ |
|   |       |      | $R_2 = $ plano | $S_1 = 0.0059$ |
| II | 1.492 | 57.2 | $R_3 = -0.486$ | $t_2 = 0.0078$ |
|   |       |      | $R_4 = 0.272$ | $S_2 = 0.0114$ |
| III | 1.592 | 30.8 | $R_5 = -0.540$ | $t_3 = 0.0078$ |
|   |       |      | $R_6 = 0.334$ | $S_3 = 0.0205$ |
| IV | 1.589 | 48.7 | $R_7 = 0.731$ | $t_4 = 0.0197$ |
|   |       |      | $R_8 = -0.248$ | $S_4 = 0.9875$ |

F = 1.00
L.O.A. = 0.094
f/8.0
Baker's Ratio = 0.85
Petzval sum = 0.198 wherein Roman numerals identify lens element in order from front to rear; $n_d$ is the refractive index at 587.6 nanometers; $\nu$ is Abbe's ratio; $R_1, R_2, \ldots$ represent radii of successive refractive surfaces from front to rear; $t$ and $S$ represent thicknesses of lens elements and air spaces, respectively.

6. The compact, four element photographic objective lens described in claim 5, wherein focusing on close subjects is accomplished by moving the first element, Lens I, to increase $S_1$.

7. A compact, four element photographic objective lens having the design parameters for a unit focal length, F, presented in the following table:

Specie D

| Lens | $n_d$ | $\nu$ | Radii | Thicknesses |
|---|---|---|---|---|
| I | 1.678 | 55.2 | $R_1 = 0.213$ | $t_1 = 0.0207$ |
|   |       |      | $R_2 = $ plano | $S_1 = 0.0056$ |
| II | 1.492 | 57.2 | $R_3 = -0.500$ | $t_2 = 0.0072$ |
|   |       |      | $R_4 = 0.277$ | $S_2 = 0.0093$ |
| III | 1.592 | 30.8 | $R_5 = -0.701$ | $t_3 = 0.0072$ |
|   |       |      | $R_6 = 0.352$ | $S_3 = 0.0113$ |
| IV | 1.615 | 51.2 | $R_7 = 1.179$ | $t_4 = 0.0311$ |
|   |       |      | $R_8 = -0.270$ | $S_4 = 0.986$ |

F = 1.00
L.O.A. = 0.092
f/8.0
Baker's Ratio = 0.90
Petzval sum = 0.189 wherein Roman numerals identify lens elements in order from front to rear; $n_d$ is the refractive index at 587.6 nanometers; $\nu$ is Abbe's ratio; $R_1, R_2, \ldots$ represent radii of successive refractive surfaces from front to rear; $t$ and $S$ represent thicknesses of lens elements and air spaces, respectively.

8. The compact, four element photographic objective lens described in claim 7, wherein focusing on close subjects is accomplished by moving the first element, Lens I, to increase $S_1$.

* * * * *